Figure 1:
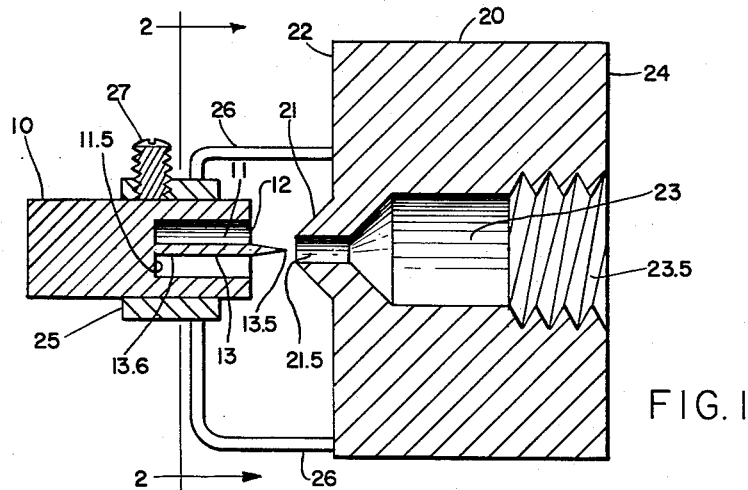

Feb. 16, 1965    S. R. RICH    3,169,507
ELASTIC WAVE GENERATOR
Filed June 14, 1961    2 Sheets-Sheet 1

INVENTOR.
STANLEY R. RICH
BY
ATTORNEY

Feb. 16, 1965  S. R. RICH  3,169,507
ELASTIC WAVE GENERATOR
Filed June 14, 1961  2 Sheets-Sheet 2

INVENTOR.
STANLEY R. RICH
BY
ATTORNEY 3,169,507
ELASTIC WAVE GENERATOR
Stanley R. Rich, West Hartford, Conn., assignor, by mesne assignments, to Northern Industries, Inc., Dover, Del., a corporation of Delaware
Filed June 14, 1961, Ser. No. 117,015
16 Claims. (Cl. 116—137)

This invention relates in general to apparatus for generating high intensity elastic waves in a gaseous medium, and more particularly to the class of such apparatus which depends for its operation upon fluid dynamics in a structure having parts fixed relative to one another, rather than upon relative motion between parts of a structure having relatively movable parts.

Electromechanical transducers for use in generating elastic wave energy in industrial, medical and other processes exist in wide varieties. Liquid-phase elastic wave energy processing equipment for bath processing and flow processing, such as cleaning, pickling, plating and emulsifying, for example, and solid phase elastic wave energy processing equipment, for cutting, drilling, welding and soldering, for example, have been perfected to the point where they are commercially useful. These equipments use magnetostrictive, electrodynamic and piezoelectric transducers, among others. Most electromechanical transducers are, however, of limited usefulness for the generation of sonic power in gases. Yet, numerous gas-phase applications of elastic wave vibrations (so-called sonic or ultrasonic energy) have been known for years, and await merely the provision of a suitable generator of elastic waves in gaseous media to make possible their exploitation. Some of these applications are defoaming in chemical processes and in all manner of processes for the handling of liquids under conditions which can produce foam, precipitation of smoke or dust from the atmosphere, exhaust fumes and other environments, precipitation of chemical and atmospheric fogs, cleaning of solid surfaces, treatment of biological specimens, killing some insects and bacteria, and the production of emulsions. In general, to generate elastic wave vibrations suitable for gas-phase processing requires "sound" intensities as high as 160 db (1 watt/cm.$^2$) in the gaseous medium (e.g., air), and total power of the order of tens or hundreds of watts, so that a generator of elastic waves which will be suitable for such gas-phase applications must be able to generate and radiate such a quantity of power at such a level, and must do it economically and dependably. Further, since some "sound" intensities as high as 160 db in air are much too loud for the human ear to endure without severe pain, and possible damage, sound insulation constitutes a major problem confronting exploitation of applications of "sonic" power in the gas phase, unless the generator can be made to operate in the ultrasonic frequency range (e.g., at 20,000 c.p.s. or higher).

Various classes and types of apparatus exist for the purpose of generating high intensity elastic waves in a gaseous medium, such as very loud sound in air, and some have achieved limited success for specific purposes. The siren exemplifies apparatus employing relatively movable parts to generate such elastic waves, and types have been developed which can indeed generate extremely high intensity waves. The siren is discussed in "Sonics," Hueter and Bolt, John Wiley & Sons, Inc., 1955, Sec. 7.8, pages 295–302. Unfortunately, sirens in general are expensive and bulky, complex to build, require large quantities of power both to supply gas and to drive their moving parts, and require costly maintenance. Sirens have achieved only limited utility, being employed, for example, for signalling at low audio frequencies, as in air-raid and civil defense warning systems. They have found little or no use for industrial purposes.

The class of apparatus for generating elastic waves in gaseous media which depends for its operation upon fluid dynamics in a structure having parts fixed relative to one another generally includes a structure having an edge, a cavity, or one or more combinations of these, and means to move or propel air, steam or other gas relative thereto. The term "whistle" is commonly and loosely applied to many types of devices which fall in this class. An early type of whistle which falls in this class is shown in U.S. Patent No. 1,515,471 issued November 11, 1924 to Foley, for a Locomotive Whistle and Mounting; steam is used as the operating medium, and this device is intended to generate elastic waves in air at audible frequencies. Another elastic wave generator in this class is the so-called "Hartmann whistle" consisting basically of a resonator cavity having an opening surrounded by a sharp whistle edge facing a coaxial nozzle which propels a jet or stream of gas toward the cavity (see "Sonics," ibid. pages 286–288). The conversion efficiency of the Hartmann whistle is of the order of 5 percent, and this type of generator has not found useful applications owing principally to its high cost of operation, which derives from the fact (among others) that the driving gas must flow through the nozzle at a supersonic velocity, so that the consumption of compressed air (or other gas) is prohibitively high. Modifications of the dimensions of the Hartmann whistle, and addition of a secondary resonance chamber by Boucher (Journ. Acoust. Soc. Am. 29, No. 5, 573–583 (May 1957) improved the efficiency somewhat, but not enough to overcome this drawback.

Modifications of the Hartmann whistle are shown in the U.S. Patents No. 2,238,668 to Wellenstein and No. 2,519,619 issued August 22, 1950 to John I. Yellott et al., for an Acoustic Generator. In each of these patents a coaxial rod or stem is disposed in the nozzle, so that the gas jet is of annular cross section, forming a hollow core gas jet, in order to strike the peripheral whistle edge of a Hartmann-type resonator. In Yellott et al., this coaxial stem extends continuously throughout the entire length of the interior of the nozzle to the interior of the resonator caivty, terminating at one end on the bottom of the resonator cavity. Other researches on the Hartmann generator led to the development of a new form called the "stem generator" ("Synchronisation of Air-Jet Generators with an Appendix on the Stem Generator," Hartmann and Trudso, Dan, Mat. Fys. Medd. 26, No. 10, (1951), pages 2–39). In this form, the resonator cavity is mounted on a rod which is coaxial with the nozzle and the cavity; this rod extends from the bottom of the cavity throughout the entire length of the interior of the nozzle to a point inside the driving gas feed pipe, where it is affixed to the interior of the pipe.

These modifications constitute a type of Hartmann generator in which the gas jet issuing from the nozzle must flow around the coaxial stem which is disposed in the nozzle, so that the jet is hollow. They suffer from the common defect that air friction in the nozzle space, which is thus constricted, causes severe losses, reducing the efficiency of the generator. Another difficulty common to structures of this type arises from the problem of assuring stability and concentricity of the rod or stem in the nozzle; this is a practical manufacturing difficulty which both increases costs and demands tight dimensional tolerances. Further, all of these versions of this type of generator suffer from the additional common defect that they are not readily adapted for operation at ultrasonic frequencies, a serious deficiency when operating with sound intensities as high as 160 db. Structurally, like the earlier whistle of Foley (above), the Hartmann whistle and these modifications of it employ a sharp edge peripherally surrounding the opening to the resonator cavity, to generate "sound" waves.

The advantage claimed for the Hartmann stem generator is that it is operative with an air jet which does not reach the speed of sound. Unfortunately, this type of generator becomes inefficient at higher ranges of gas pressure, starting at approximately 3 atmospheres excess pressure (i.e., about 45 p.s.i. gauge), as is pointed out by Yellott.

It is the principal object of the present invention to provide new and improved apparatus for generating elastic waves in a gaseous medium. Another object is to provide such apparatus which can be made to operate in the ultrasonic frequency range. Additional objects are to provide such apparatus which does not have severe dimensional tolerances, which will be economical to build and operate, and rugged in construction, which will require little or no maintenance, which will be easily cleaned, assembled and put into use, and which can be adapted to all types and kinds of gas-phase applications of elastic wave power.

According to the invention, there is provided a new and improved apparatus for generating high intensity elastic waves in a gaseous medium comprising, a body having a cavity with an opening thereinto, a pin having a pointed end, said pin being located at least in part in said cavity and extending in the direction of a line which extends from a wall of said cavity through said opening, said pointed end being directed away from said wall, and means confronting said opening for propelling a stream of gas at said pointed end substantially toward the interior of said cavity. By the term "high intensity" is meant elastic wave energy in a gaseous medium (e.g., "sonic" or "ultrasonic" energy) at an intensity level up to about 160 db (1 watt/cm.$^2$). By the term "gas" it is meant to include steam, air, nitrogen, carbon dioxide and the like.

In the present invention, the vortex-forming mechanism is the pointed end of a simple and lightweight pin. The peripheral edge of the resonator surrounding the opening to the cavity need not be sharpened, and can be flattened or rounded, at the discretion of the designer. The term "pointed end" is meant to apply to any configuration of a rod or pin in which the sides of the pin converge toward each other as they approach the end, and includes, without limitation on its generality, sharpened and blunted pointed pin ends. Further, in the present invention the nozzle orifice is substantially free of obstruction, even in embodiments having the pointed end of the pin intruding slightly into the orifice. Thus the frictional losses in air flow are held to a minimum. The vortex-forming pin in the present invention is physically short, and its position has been found to be non-critical relative to both axial and radial position, thus permitting easier and less costly manufacture.

Figure 2:
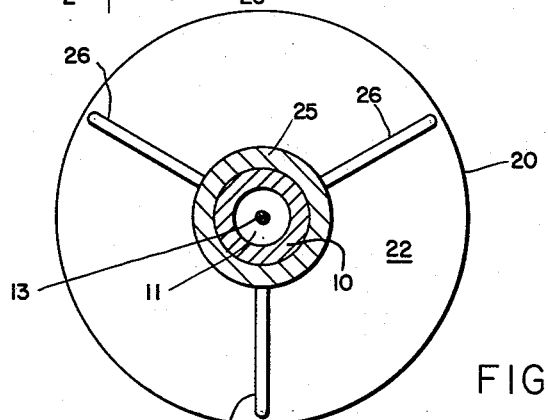
Figure 3:
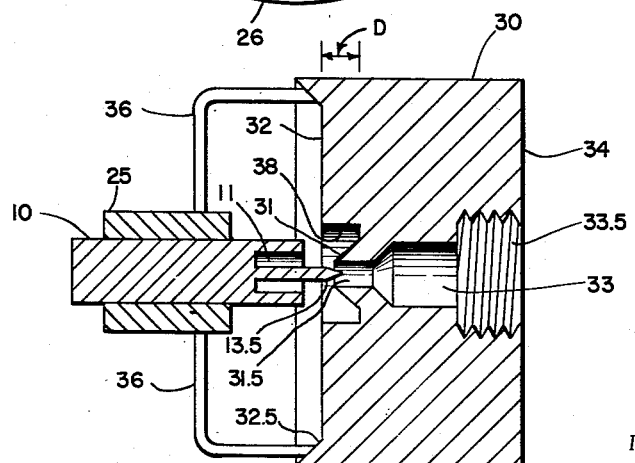
Figure 5:
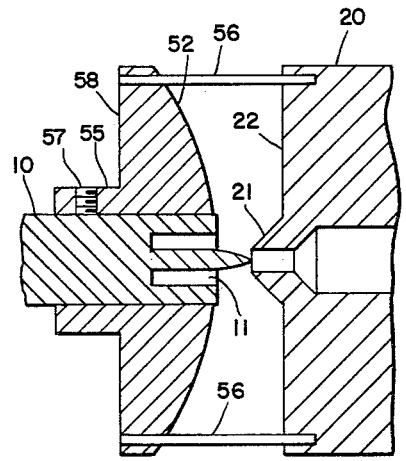
Figure 4:
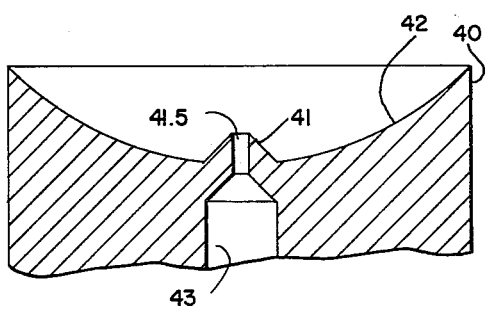
Figure 6:
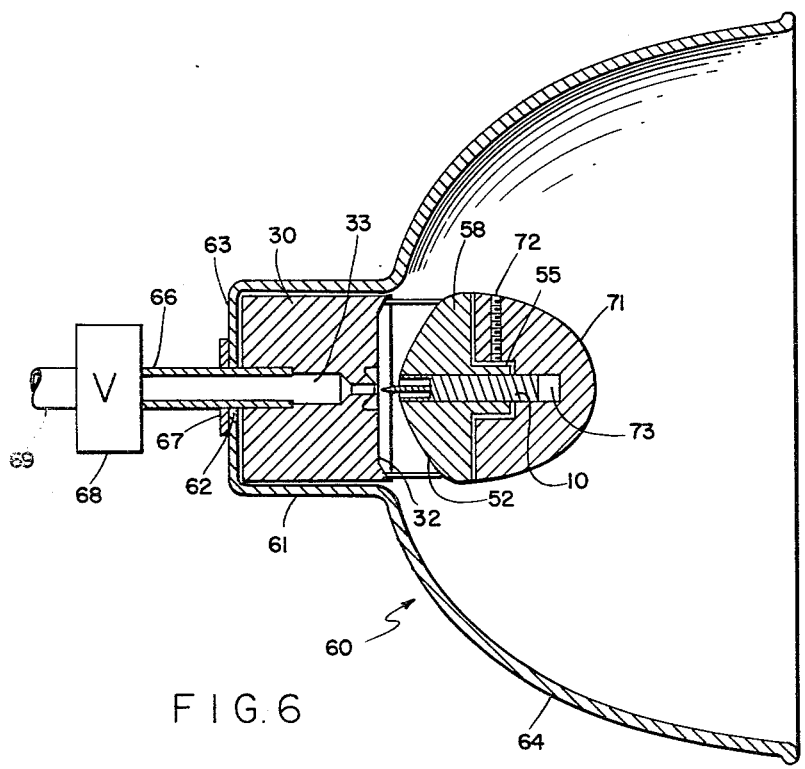

Other and further objects and features of the invention will become apparent from the following description of certain embodiments thereof. This description refers to the accompanying drawings, wherein:

FIG. 1 is an axial section of a first embodiment;
FIG. 2 is a cross section on line 2—2 of FIG. 1;
FIG. 3 is an axial section of a second embodiment;
FIG. 4 is a partial view in axial section showing a modification of one part of the generator which may be used with any of the embodiments shown;
FIG. 5 is an axial section of a third embodiment; and
FIG. 6 is an axial section of a fourth embodiment, fitted with a wave reflector and other parts which may be used with any of the other embodiments herein shown.

Referring to FIGS. 1 and 2, a first body 10, of elongated cylindrical form, has a cavity 11 in one end thereof. The cavity is open at the extreme end 12 of the body 10, and closed elsewhere, and a pin 13, having a pointed end 13.5, is axially mounted in the cavity 11 with one end 13.6 affixed to the bottom wall 11.5 of the cavity and the pointed end 13.5, extending through the open end 12. There is no special requirement for the shape of the peripheral edge surrounding the open end 12 of the cavity 11. This end may be cut normal to the axis of the first body 10, as shown in FIG. 1. A second body 20 has a gas nozzle 21 centrally disposed on a wave reflecting surface 22. The nozzle 21 projects forward of the surface 22, and has an orifice 21.5, which is smaller in diameter than the cavity 11, and communicates with a bore 23 of larger diameter passing through the body 20 to the rear boundary 24. The bore 23 is internally threaded at the end 23.5 meeting the rear boundary 24, for attachment to a feed pipe (not shown) for gas. A sleeve 25 is mounted to the second body 20 on three stand-off posts 26, and holds the first body in a position which is adjustable along the common axis of the first body 10 and the orifice 21.5 of the gas nozzle 21. A set-screw 27 in the sleeve 25 is used to lock the first body 10 in position therein. The distance between the nozzle 21 and the opening 12 of the cavity 11 is thereby adjustable.

The operation of the generator shown in FIG. 1 is believed to be as follows. When a gas, such as air, is propelled at the opening 12 of the cavity 11, and at the pointed end 13.5 of the pin 13, through the orifice 21.5 of the nozzle 21, in the form of an air jet, the jet strikes the point 13.5, which acts like a "whistle edge" reduced to the smallest possible dimension, namely a single point. The air in the jet strikes this point, then enters the cavity and exits from the cavity, generating intense "sound waves" as it does so. These waves have a frequency of oscillation related to the depth and diameter of the cavity 11. Typical dimensions for frequencies in the range 8000 to 24,000 cycles per second are:

(a) Diameter of orifice 21.5—1/8 inch;
(b) Projection of nozzle 21 from surface 22—1/8 inch (approximately);
(c) Diameter of cavity 11—1/4 inch;
(d) Depth of cavity 11:
  (i) for frequencies of the order of 20 kc./sec.—1/8 inch;
  (ii) for frequencies of the order of 12 kc./sec.—5/16 inch;
(e) Projection of pin outside of open end 12 of cavity 11—3/16 inch (approximately);
(f) Distance between opening 12 of cavity 11 and nearest confronting end of nozzle 21—preferably 3/16 inch, and may approach 3/4 inch.

The air pressure requirements of this generator are lower than for any previously designed dynamic generator. The present generator begins to operate at one (1) pound per square inch of excess pressure and produces industrially useful defoaming of certain (low viscosity) liquids at 12 pounds per square inch excess pressure. Its output sound power is linearly related to input pneumatic power from 1 p.s.i. to 70 p.s.i. (excess, or gauge, pressure). The speed of the air jet is approximately 1/10 the speed of sound in air, in the lowest pressure mode of operation, and varies to about 4 times the speed of sound at very high pressures. This device can be operated at jet speeds above and below the speed of sound in air.

Referring now to FIG. 3, wherein parts which are the same as in the embodiment of FIG. 1 have the same reference characters, the first body 10 is associated with a second body 30 having a nozzle 31 recessed in a wave reflector surface 32. Surrounding the wave reflector surface is a sloped rim 32.5, at which stand-off posts 36 are mounted at one end of each to the second body 30. These posts, which are similar to the stand-off posts 26 in FIG. 1, serve the same purpose, namely to hold the sleeve 25 in fixed position relative to the second body 30. The embodiment of FIG. 3 has four stand-off posts 36, of which only two are shown in the figure. The nozzle 31 has an orifice 31.5 leading into a bore 33 of larger diameter through the second body 30, which in turn terminates at the rear boundary 34 in an internally threaded portion 33.5 of still larger internal diameter, for coupling to a pipe (not shown) for air or gas feed to the nozzle 31.

The recess 38 in the reflector surface 32 surrounding the nozzle 31 constitutes a secondary cavity in which a secondary resonance may be excited by gas issuing from the primary cavity 11 in the first body 10. For example, the secondary cavity 38 may have a diameter of 7/16 to 9/16 inch, and a depth (D) of 1/8 to 3/8 inch, and, with nozzle, orifice, primary cavity and pin dimensions as set forth above for the embodiment of FIG. 1, secondary cavity dimensions in these ranges can be found which will affect the frequency of the primary cavity either constructively or destructively. More specifically, a secondary cavity 38 having a depth (D) of 175 thousandths of an inch and a diameter of 7/16 inch will cooperate constructively with a primary cavity 11 having a diameter of 1/4 inch and a depth of 5/16 inch, to enhance the output of acoustic energy at a frequency of 10,000 cycles per second (approximately). This arrangement generates a single frequency. A preferred spacing between the outer end of the nozzle 31 and the confronting end of the first body 10 at the aperture 12 of the primary cavity 11 is 3/16 inch. The distance which the pointed end 13.5 of the pin 13 projects outside the aperture 12 is, for example, 5/32 inch, to 7/32 inch. In the latter case, the extremity of the pointed end 13.5 of the pin intrudes slightly into the orifice 31.5, as is shown in FIG. 3.

Referring to FIG. 4, an alternative form of the nozzle and wave reflector structure is provided in a second body 40 having a concave wave reflector surface 42. A nozzle 41 having an orifice 41.5 communicating through the reflector surface with a bore 43, is of similar structure to the nozzles 21 and 31 of FIGS. 1 and 3, respectively, and projects forward of the wave reflector surface. The concave wave reflector surface 42 is useful to focus the "sound" waves generated by a system employing this particular second body 40, especially at the higher ultrasonic frequencies.

FIG. 5 has a first body 10 and a second body 20 with nozzle 21, which are all similar to the corresponding parts found in FIG. 1. The mounting structure for supporting the bodies 10 and 20 with respect to each other is different, and comprises a supporting element 58 of substantially the same cross-sectional dimensions as the second body 20, with a convex surface 52 confronting the wave reflector surface 22 of the second body, and having a sleeve portion 55 in the center. The first body 10 is held in the sleeve portion 55, which corresponds to the sleeve 25 in FIG. 1 and a set-screw 57 is provided to lock the first body in the sleeve portion. Stand-off rods 56 serve to mount the support element 58 on the second body 20, with the convex surface 52 spaced a desired distance from the second body wave reflector surface 22. These two surfaces 52 and 22 constitute an annular horn for wave energy generated at the cavity 11.

In FIG. 6 a generator comprising a first body 10 supported in a support element 58 (as in FIG. 5) combined with a second body 30 (as in FIG. 3) is disposed in a wave director structure 60. The wave director structure comprises a cylindrical base portion 61 having a hole 62 through the central portion of its bottom wall 63, and a wave directing reflector 64 at its mouth. The wave director may be, for example, a parabolic figure of revolution. A pipe 66 is fitted into the bore 33 of the second body 30 and a lock nut 67 or other suitable locking device on the pipe bears against the outer surface of the bottom wall 63, to hold the second body firmly locked in the base portion 61 of the wave director. A pressure regulating valve 68 indicated by a block V intervenes between the pipe 66 and a gas line 69 for compressed air or other suitable gas. The valve 68 serves to adjust the gas pressure through the orifice of the second body 30. A streamlined body 71 is attached to the front of the wave generator to smooth the flow of gas after it passes between the surfaces 32 and 52, thereby to form a smooth continuation of the annular horn between those two surfaces, oriented 90° with respect to that annular horn. The streamlined body 71 is affixed to the sleeve portion 55 of the supporting element 58 by means of a set-screw 72. A bore 73 is provided in the streamline element of sufficient depth to allow for adjustment of the first body 10.

Each of the embodiments of the invention shown in the accompaning drawings is a cylindrical figure of revolution about a central axis (not shown), as is indicated by FIG. 2. Other forms are possible; the cylindrical form is preferred for its obvious mechanical and technical simplicity. All the parts may be made of any suitable material. Stainless steel of the 300 series is preferred.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. Apparatus for generating high intensity elastic waves in a gaseous medium comprising, a first body having a cavity with a single opening thereinto, a pin having a pointed end, said pin being located at least in part in said cavity and extending in the direction of a line which extends from a wall of said cavity through said opening, said pointed end being located outside said cavity and directed away from said wall, and a second body having a gas nozzle confronting said opening and said pointed end for propelling a stream of gas at said pointed end substantially in said direction toward the interior of said cavity, said second body having a substantially flat wave reflecting surface surrounding said nozzle, said nozzle extending above said surface toward said opening, there being a substantially free exhaust path for gas passage in directions normal to said first-named direction and tangent to said surface from the vicinity of said pointed end along said surface, said path substantially including said pointed end.

2. Apparatus for generating high intensity elastic waves in a gaseous medium comprising, a first body having a cavity with a single opening thereinto, a pin having a pointed end, said pin being located at least in part in said cavity and extending in the direction of a line which extends from a wall of said cavity through said opening, said pointed end being located outside said cavity and directed away from said wall, and a second body having a gas nozzle confronting said opening and said pointed end for propelling a stream of gas at said pointed end substantially in said direction toward the interior of said cavity, said second body having a wave reflecting surface surrounding said nozzle and an annular depression in said surface immediately surrounding said nozzle, there being a substantially free exhaust path for gas passage in directions normal to said first-named direction and tangent to said surface from the vicinity of said pointed end along said surface, said path substantially including said pointed end.

3. Apparatus for generating high intensity elastic waves in a gaseous medium comprising, a first body having a convex surface and a cavity with a single opening thereinto through said surface, a pin having a pointed end, said pin being located at least in part in said cavity and extending in the direction of a line which extends from a wall of said cavity through said opening, said pointed end being located outside said cavity and directed away from said wall, and, a second body having a gas nozzle confronting said opening and said pointed end for propelling a stream of gas at said pointed end substantially in said direction toward the interior of said cavity, said second body having a wave reflecting surface surrounding said nozzle and confronting said convex surface, said two surfaces defining an annular horn for elastic waves, there being a substantially free exhaust path for gas passage in directions normal to said first-named direction from the vicinity of said pointed end and between said surfaces, said path substantially including said pointed end.

4. Apparatus for generating high intensity elastic waves in a gaseous medium comprising, a first body of elongated shape having at one end a cavity with a single opening thereinto through said end, a pin having a pointed end, said pin being located at least in part in said cavity and extending in the direction of the long dimension of said first body from a wall of said cavity through said opening, said pointed end being located outside said cavity and directed away from said wall, a second body having a gas nozzle confronting said opening and said pointed end for propelling a stream of gas at said pointed end substantially in the direction of said long dimension toward the interior of said cavity, support means mounted on said second body for holding said first body a prescribed distance from said second body, said support means including a sleeve surrounding said first body, releasable means to lock said first body in said sleeve, said sleeve having its axis parallel to said long dimension, means providing a first wave reflecting surface surrounding said nozzle, and means providing a second wave reflecting surface surrounding said sleeve, said two surfaces defining an annular horn for elastic waves, there being a substantially free exhaust path for gas passage in directions normal to said first-named direction from the vicinity of said pointed end and between said surfaces, said path substantially including said pointed end.

5. Apparatus for generating high intensity elastic waves in a gaseous medium comprising, a body having a convex surface and a cavity with a single opening thereinto, through said surface, a pin having a pointed end, said pin being located at least in part in said cavity and extending in the direction of a line which extends from a wall of said cavity through said opening, said pointed end being located outside said cavity and directed away from said wall, nozzle means confronting said opening and said pointed end for propelling a stream of gas at said pointed end substantially toward the interior of said cavity, and means providing a wave reflecting surface surrounding said nozzle, the part of said wave reflecting surface in the immediate vicinity of said nozzle confronting said convex surface and defining therewith an annular horn for elastic waves, there being a substantially free exhaust path for gas passage in directions normal to said first-named direction from the vicinity of said pointed end and between said surfaces, said path substantially including said pointed end.

6. Apparatus for generating high intensity elastic waves in a gaseous medium comprising, a first body having a cylindrical cavity closed at one end and open at the other, a pin having a pointed end axially located in said cavity extending from the bottom and having the pointed end extending through the open end of said cavity, a second body having a substantially flat surface disposed closely adjacent said pointed end and normally to said axis and having a gas nozzle centrally mounted thereon with its orifice aimed to propel a stream of gas at said pointed end in the direction of said axis toward the bottom of said cavity, means supporting said first body with respect to said second body, and a concave wave reflector extending from said second body substantially at the periphery of said surface through and laterally enclosing a region surrounding said first body, there being a substantially free exhaust path for gas passage in directions normal to said first-named direction from the vicinity of and substantially including said pointed end.

7. Apparatus for generating high intensity elastic waves in a gaseous medium comprising, a first body having a convex surface and centrally disposed in said body a cylindrical cavity closed at one end and open at the other end through said surface, the axis of said cavity being normal to said surface, a pin having a pointed end axially located in said cavity extending from the bottom and having the pointed end extending through the open end of said cavity, a second body having a substantially flat surface disposed confronting said convex surface closely adjacent said pointed end and normally to said axis and having a gas nozzle centrally mounted thereon with its orifice aimed to propel a stream of gas at said pointed end in the direction of said axis toward the bottom of said cavity, and means supporting said first body with respect to said second body, said convex and flat surfaces defining an annular horn for wave energy, there being a substantially free exhaust path for gas passage in directions normal to said first-named direction from the vicinity of said pointed end and between said surfaces, said path substantially including said pointed end.

8. Apparatus for generating high intensity elastic waves in a gaseous medium comprising, a first body having a convex surface and centrally disposed in said body a cylindrical cavity closed at one end and open at the other end through said surface, the axis of said cavity being normal to said surface, a pin having a pointed end axially located in said cavity extending from the bottom and having the pointed end extending through the open end of said cavity, a second body having a substantially flat surface disposed confronting said convex surface closely adjacent said pointed end and normally to said axis and having a gas nozzle centrally mounted thereon with its orifice aimed to propel a stream of gas at said pointed end in the direction of said axis toward the bottom of said cavity, means supporting said first body with respect to said second body, said convex and flat surfaces defining an annular horn for wave energy, there being a substantially free exhaust path for gas passage in directions normal to said first-named direction from the vicinity of said pointed end and between said surfaces, said path substantially including said pointed end, and a concave wave reflector extending from said second body substantially at the periphery of said flat surface through and laterally enclosing a region surrounding said first body.

9. Apparatus for generating high intensity elastic waves in a gaseous medium comprising a first body having a convex surface and centrally disposed in said body a cylindrical cavity closed at one end and open at the other end through said surface, the axis of said cavity being normal to said surface, a pin having a pointed end axially located in said cavity extending from the bottom and having the pointed end extending through the open end of said cavity, a second body having a substantially flat surface disposed confronting said convex surface closely adjacent said pointed end and normal to said axis and having a gas nozzle centrally mounted thereon with its orifice aimed to propel a stream of gas at said end in the direction of said axis toward the bottom of said cavity, means supporting said first body with respect to said second body, said convex and flat surfaces defining an annular horn for wave energy, there being a substantially free exhaust path for gas passage in directions normal to said first-named direction from the vicinity of said pointed end and between said surfaces, said path substantially including said pointed end, a concave wave reflector extending from said second body substantially at the periphery of said flat surface through and laterally enclosing a region surrounding said first body and a tapered plug extending away from said first body in the direction of said axis, the base of said plug being mounted on said first body and the smaller end being remote therefrom, said plug and reflector defining an annular extension of said horn which is bent substantially 90° relative to said horn.

10. Apparatus for generating high intensity elastic waves in a gaseous medium comprising, cavity means having a single opening thereinto, means providing a substantially pointed gas deflector outside said cavity adjacent said opening for forming a gas vortex, unobstructed means outside said cavity confronting said opening and said deflector for propelling a stream of gas at said deflector and in a first direction substantially toward the interior of said cavity, said stream of gas having a solid transverse cross-section at the point of said pointed gas deflector, there being a substantially free exhaust path for gas passage in directions normal to said first direction in the vicinity of said deflector.

11. Apparatus for generating high intensity elastic waves in a gaseous medium comprising, a body having a cavity with a single opening thereinto, a pin having a pointed end, said pin being located at least in part in said cavity and extending out of said cavity through said opening, said pointed end being located outside of said cavity, and unobstructed means outside said cavity confronting said opening and said pointed end for propelling a stream of gas at said pointed end in a first direction substantially toward the interior of said cavity, said stream of gas having a solid transverse cross-section at the pointed end of said pin, there being a substantially free exhaust path for gas passage in directions normal to said first direction in the vicinity of said pointed end.

12. Apparatus for generating high intensity elastic waves in a gaseous medium comprising, a first body having a cavity with a single opening thereinto, a pin having a pointed end, said pin being located at least in part in said cavity and extending out of said cavity through said opening, said pointed end being located outside of said cavity, and a second body having a substantially unimpeded gas nozzle confronting said opening and said pointed end for propelling a stream of gas having a solid transverse cross-section at said pointed end in a first direction substantially toward the interior of said cavity, there being a substantially free exhaust path for gas passage in directions normal to said first direction in the vicinity of said pointed end.

13. Apparatus for generating high intensity elastic waves in a gaseous medium comprising, cavity means having a single opening thereinto, means providing a substantially pointed gas deflector outside said cavity adjacent said opening, means outside said cavity confronting said opening and said deflector for propelling a stream of gas having a solid transverse cross-section at said deflector and in a first direction substantially toward the interior of said cavity, there being a substantially free exhaust path for gas passage in directions normal to said first direction in the vicinity of said deflector, and means surrounding said gas propelling means providing a wave-reflecting surface for elastic wave energy.

14. Apparatus for generating high intensity elastic waves in a gaseous medium by means of a cavity having a single opening thereinto and a gas nozzle confronting and spaced from said opening for propelling a stream of gas having a solid transverse cross-section toward said opening and into said cavity, characterized in that an elongated gas-deflector member extends from the interior of the cavity through said opening toward said nozzle, said member having a free end with sides converging towards its axis in the direction toward said free end, said end terminating in a region extending from just outside said nozzle to slightly inside said nozzle such that at least the major portion of the converging sides is outside said nozzle for forming gas vortices in said stream substantially entirely outside said nozzle, there being a substantially free exhaust path for gas passage away from said gas-deflector member in directions transverse to said gas stream.

15. Apparatus for generating high intensity elastic waves in a gaseous medium by means of a cavity having a single opening thereinto and a gas nozzle confronting and spaced from said opening for propelling a stream of gas having a solid transverse cross-section toward said opening and into said cavity, characterized in that an elongated substantially cylindrical gas-deflector member extends from the interior of the cavity through said opening toward said nozzle, said member having a free end with sides converging towards its axis in the direction toward said free end, said end terminating in a region extending from just outside said nozzle to slightly inside said nozzle such that at least the major portion of the converging sides is outside said nozzle for forming gas vortices in said stream substantially entirely outside said nozzle, there being a substantially free exhaust path for gas passage away from said gas-deflector member in directions transverse to said gas stream.

16. Apparatus for generating high intensity elastic waves in a gaseous medium by means of a cylindrical cavity having a single opening thereinto and a gas nozzle confronting and spaced from said opening for propelling a stream of gas having a solid transverse cross-section toward said opening and into said cavity, characterized in that an elongated substantially cylindrical gas-deflector member is located coaxially within said cavity and extends from the interior of the cavity through said opening toward said nozzle, said member having a free end with sides tapering towards its axis in the direction toward said free end, said end terminating in a region extending from just outside said nozzle to slightly inside said nozzle such that at least the major portion of the tapered sides is outside said nozzle for forming gas vortices in said stream substantially entirely outside said nozzle, there being a substantially free exhaust path for gas passage away from said gas-deflector member in directions transverse to said gas stream.

References Cited by the Examiner

UNITED STATES PATENTS

| | | | |
|---|---|---|---|
| 852,647 | 5/07 | Blake | 340—12 |
| 1,530,899 | 3/25 | Limon | 116—137 |
| 1,812,234 | 6/31 | Braatelien | 116—137 X |
| 2,519,619 | 8/50 | Yellott et al. | 116—137 |
| 2,800,100 | 7/57 | Boucher | 116—137 |

FOREIGN PATENTS

| | | |
|---|---|---|
| 868,228 | 2/53 | Germany. |
| 140,350 | 8/61 | Russia. |
| 251,919 | 9/48 | Switzerland. |
| 294,390 | 1/54 | Switzerland. |

LOUIS J. CAPOZI, *Primary Examiner.*

C. W. ROBINSON, *Examiner.*